(12) United States Patent
Beveridge

(10) Patent No.: US 9,513,949 B2
(45) Date of Patent: Dec. 6, 2016

(54) MACHINE IDENTITY PERSISTENCE FOR USERS OF NON-PERSISTENT VIRTUAL DESKTOPS

(71) Applicant: VMware, Inc., Palo Alto, CA (US)

(72) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/615,366

(22) Filed: Feb. 5, 2015

(65) Prior Publication Data

US 2016/0055016 A1     Feb. 25, 2016

Related U.S. Application Data

(60) Provisional application No. 62/041,044, filed on Aug. 23, 2014, provisional application No. 62/041,045, filed on Aug. 23, 2014.

(51) Int. Cl.
  *G06F 9/46* (2006.01)
  *G06F 9/455* (2006.01)
  *G06F 9/445* (2006.01)

(52) U.S. Cl.
  CPC ......... *G06F 9/45558* (2013.01); *G06F 9/4451* (2013.01); *G06F 2009/45562* (2013.01); *G06F 2009/45575* (2013.01); *G06F 2009/45583* (2013.01)

(58) Field of Classification Search
  CPC ................ G06F 9/4881; G06F 2009/45575; G06F G06F G06F 2009/45583;G06F 9/4451; G06F 2009/45562
  See application file for complete search history.

(56) References Cited

U.S. PATENT DOCUMENTS

| | | |
|---|---|---|
| 6,795,966 B1 | 9/2004 | Lim et al. |
| 7,484,208 B1 | 1/2009 | Nelson |
| 7,680,919 B2 | 3/2010 | Nelson |
| 7,725,531 B1 | 5/2010 | Sood |
| 8,239,633 B2 | 8/2012 | Wood et al. |
| 8,285,808 B1 | 10/2012 | Joel et al. |
| 8,307,187 B2 | 11/2012 | Chawla et al. |
| 8,499,191 B2 | 7/2013 | Shimada |
| 8,555,274 B1 | 10/2013 | Chawla |
| 8,631,066 B2 | 1/2014 | Lim |
| 8,793,427 B2 | 7/2014 | Lim et al. |
| 8,904,081 B1 | 12/2014 | Kulkarni |

(Continued)

FOREIGN PATENT DOCUMENTS

GB     2 483 300     3/2012

OTHER PUBLICATIONS

Unknown, "Project Serengeti", accessed at <<http://www.projectserengeti.org>>, accessed on Dec. 19, 2013, 2 pages.

(Continued)

*Primary Examiner* — Camquy Truong

(57) ABSTRACT

Examples perform creation of a non-persistent virtual machine with a persistent machine identity associated with the user of the virtual machine, to provide consistent virtual desktop sessions to the user. Some examples contemplate that the machine identity is inserted into a virtual machine created through cloning, forking, or from a virtual machine pool.

16 Claims, 6 Drawing Sheets

(56) References Cited

U.S. PATENT DOCUMENTS

| | | | |
|---|---|---|---|
| 9,081,686 | B2 | 7/2015 | Beveridge et al. |
| 2004/0010787 | A1 | 1/2004 | Traut et al. |
| 2006/0129627 | A1* | 6/2006 | Phillips ............... H04L 63/10 709/200 |
| 2006/0227585 | A1 | 10/2006 | Tomoda |
| 2007/0074208 | A1 | 3/2007 | Ling et al. |
| 2007/0204121 | A1 | 8/2007 | O'Connor et al. |
| 2009/0007106 | A1 | 1/2009 | Araujo, Jr. |
| 2009/0113109 | A1 | 4/2009 | Nelson et al. |
| 2010/0023942 | A1 | 1/2010 | Sheu et al. |
| 2010/0186011 | A1 | 7/2010 | Magenheimer |
| 2011/0154331 | A1 | 6/2011 | Ciano et al. |
| 2012/0066679 | A1 | 3/2012 | Pappas et al. |
| 2012/0144391 | A1 | 6/2012 | Ueda |
| 2012/0174096 | A1* | 7/2012 | Conover ............. G06F 9/45558 718/1 |
| 2012/0204060 | A1 | 8/2012 | Swift et al. |
| 2012/0272236 | A1 | 10/2012 | Baron |
| 2013/0047160 | A1* | 2/2013 | Conover ................ G06F 8/65 718/1 |
| 2013/0067289 | A1 | 3/2013 | Maislos et al. |
| 2013/0097377 | A1 | 4/2013 | Satoyama |
| 2013/0111474 | A1 | 5/2013 | Agarwal et al. |
| 2013/0246355 | A1 | 9/2013 | Nelson |
| 2013/0332610 | A1 | 12/2013 | Beveridge et al. |
| 2014/0047193 | A1 | 2/2014 | Gross et al. |
| 2014/0068181 | A1 | 3/2014 | Mridha et al. |
| 2014/0075127 | A1 | 3/2014 | Garthwaite |
| 2014/0115228 | A1 | 4/2014 | Zhou et al. |
| 2014/0156910 | A1 | 6/2014 | Uttamchandani et al. |
| 2014/0164723 | A1 | 6/2014 | Garthwaite |
| 2014/0173181 | A1 | 6/2014 | Beveridge |
| 2014/0173196 | A1 | 6/2014 | Beveridge et al. |
| 2014/0173213 | A1 | 6/2014 | Beveridge |
| 2014/0245294 | A1 | 8/2014 | Kaul |
| 2014/0366019 | A1 | 12/2014 | Bajaj |
| 2015/0089496 | A1* | 3/2015 | Thankappan ......... G06F 9/5005 718/1 |
| 2015/0178108 | A1 | 6/2015 | Tarasuk-Levin |
| 2015/0178110 | A1 | 6/2015 | Li et al. |

OTHER PUBLICATIONS

Unknown, "Welcome to Apache Hadoop!", accessed at <<http://hadoop.apache.org>>, accessed on Dec. 12, 2013, 4 pages.
Unknown, "Horizon View", accessed at <<http://vmware.com/products/horizon-view>>, accessed on Dec. 19, 2013, 6 pages.
Lagar-Cavilla et al. "SnowFlock: Virtual Machine Cloning as a First Class Cloud Primitive", ACM Transactions on Computing Systems, vol. 29(1), Feb. 2011, 50 pages.
Unknown, "What's new in private Paas? Introducing OpenShift Enterprise 2.0", accessed at <<http://www.redhat.com/about/events-webinars/webinars/2013-12-17-openshift-enterprise-2>>, accessed on Dec. 19, 2013, 1 page.
Unknown, "RemoteApp for Hyper-V", Remote Desktop Services Blog, accessed at <<http://www.blog.msdn.com/birds/archive/2009/12/15/remoteapp-for-hyper-v.aspx, accessed on Dec. 2009, 5 pages.
Unknown, "LXC", accessed at <<http://www.en.wikipedia.org/wiki/LXC>>, accessed on Dec. 19, 2013, 2 pages.
Unknown, "Linux-VServer", accessed at <<http://en.wikipedia.org/wiki/Linux-V-Server>>, accessed on Dec. 19, 2013, 3 pages.

International Search Report and Written Opinion received in co-pending International Patent Application No. PCT/US2015/046177, filed Aug. 20, 2015. Received Oct. 30, 2015. 11 pages.
Liu, H. et al. *Live Virtual Machine 1-20 Migration via Asynchronous Replication and State Synchronization*. IEEE Transactions on Parallel and Distributed Systems, vol. 22, No. 12. Los Alamitos, CA. Published Dec. 1, 2011. 14 pages.
International Search Report and Written Opinion received in co-pending International Patent Application No. PCT/US2015/046178, filed Aug. 20, 2015. Received Oct. 26, 2015. 11 pages.
"Atlantis ILIO in XenApp Environments, 1-20 1". Published Apr. 1 2014. Retrieved on Oct. 15, 2015. Retrieved from the Internet: URL:<http://web.archive.org/web/20140701144808/http://atlantiscomputing.com/downloads/WPAtlantisILIOinXenApp Environments20140424.pclf >. 2 pages.
"Atlantis ILIO Diskless VDI for VMware View". Published Jan. 24, 2014. Retrieved Oct. 15, 2015. Retrieved from the Internet: URL:<http://web.archive.org/web/20140124082015/http://www.atlantiscomputing.com/downloads/DisklessVDI Solution Brief VMWare.pdf>. 2 pages.
Vrable, M. et al. "Scalability, fidelity, and containment in the Potemkin virtual honeyfarm". ACM SIGOPS Operating Systems Review. Published Oct. 20, 2005. Retrieved from the Internet: URL:<http://portal.acm.org/citation.cfm?id=1095825>. 15 pages.
USPTO, "Non-final Office Action in U.S. Appl. No. 14/136,701", Mailed Date Jun. 18, 2015, 10 pages.
Unknown, "Project Serengeti", accessed at http://www.projectserengeti.org, accessed on Dec. 19, 2013, 2 pages.
Unknown, "Welcome to Apache Hadoop!", accessed at <<http://hadoop.apache.org>>, Dec. 12, 2013, 4 pages.
Unknown, "Horizon View", accessed at <<http://www.vmware.com/products/horizon-view>>, accessed on Dec. 19, 2013, 6 pages.
Unknown, "Cloud Foundry Community", accessed at <<http://www.cloudfoundry.org>>, accessed on Dec. 19, 2013, 2 pages.
Lagar-Cavilla et al., "SnowFlock: Virtual Machine Cloning as a First Class Cloud Primitive", ACM Transactions on Computing Systems., vol. 29(1), Feb. 2011, 50 pages.
Unknown, "What's new in private Paas? Introducing OpenShift Enterprise 2.0", accessed at <<http://www.redhal.com/aboul/events-webinars/webinars/2013-12-17-openshifl-enterprise-2>>, accessed on Dec. 19, 2013, 1 page.
Unknown, "OpenShift Platform Features", Benefits Document, Red Hat, Inc., 2012, 5 pages.
Unknown, "SnowFlock: Swift VM Cloning for Cloud Computing", accessed at <<http://sysweb.cs.toronto.edu/snowflock>>, accessed on Dec. 19, 2013, 2 pages.
Unknown, "Virtual Memory Streaming", OpenStack, Gridcentric, Inc., 2013, 2 pages.
Unknown, "RemoteApp for Hyper-V", Remote Desktop Services Blog, accessed at <<http://blog.msdn.com/b/rds/ archive/2009/12/15/remoteapp-for-hyper-v.aspx>>, Dec. 2009, 5 pages.
Unknown, "LXC", accessed at <<http://en.wikipedia.org/wiki/LXC>>, accessed on Dec. 19, 2013, 2 pages.
Unknown, "Linux-VServer", accessed at <<http://en.wikipedia.org/wiki/Linux-VServer>>, accessed on Dec. 19, 2013, 3 pages.
Non-final Office Action dated Mar. 26, 2015 for U.S. Appl. No. 13/764,405, 23 pages.
Non-final Office Action dated Mar. 27, 2015 for U.S. Appl. No. 13/764,516, 21 pages.
U.S. Appl. No. 14/615,353, filed Feb. 5, 2015, Rapid Suspend/Resume for Virtual Machines via Resource Sharing, Beveridge et al.

* cited by examiner

MACHINE IDENTITY PERSISTENCE FOR USERS OF NON-PERSISTENT VIRTUAL DESKTOPS

CROSS-REFERENCE TO RELATED APPLICATIONS

This application claims the benefit of U.S. Provisional Patent Application Ser. No. 62/041,045, filed Aug. 23, 2014 entitled "Machine Identity Persistence for Users of Non-Persistent Virtual Desktops" and U.S. Provisional Patent Application Ser. No. 62/041,044, filed Aug. 23, 2014 entitled "Rapid Suspend/Resume for Virtual Machines via Resource Sharing", both of which are incorporated by reference herein in their entireties.

This application is related to U.S. Non-Provisional patent application entitled "Rapid Suspend/Resume for Virtual Machines via Resource Sharing", filed concurrently herewith, which is incorporated by reference herein in its entirety.

BACKGROUND

Non-persistent virtual desktop infrastructure (VDI) designs create a pool of virtual desktops and assign users dynamically to any available machine in the pool at the point when users make a request for a remote session. Non-persistent VDI designs (e.g., "pools") direct users to random virtual machines (VMs), each time resulting in a new machine identity each time. Some software does not function properly in this context because it checks for a stable machine identity for licensing or security reasons. User installed applications that may be preserved using layering technology could lead to installation of applications that expect a stable machine identity at each application launch.

For example, certain classes of software fail to function properly within these VDI designs because they expect a stable machine identity. Other types of software insist on seeing a stable and static machine name for licensing reasons and will embed the name of the machine on which they were originally installed into the Registry or other configuration file, and check it at each application launch to validate that it is running on the same machine.

Some non-persistent designs cannot accommodate such software, and users needing these types of applications would need to be assigned to persistent virtual desktop. Some existing non-persistent VDI designs do not accommodate the installation of applications by users themselves. The desktops are typically 'locked-down' from a security standpoint which prevent such installations and there is no way to preserve user changes across linked-clone 'recompose' operations anyway.

Some systems use layering technology to preserve user-state across linked-clone pool operations such as recompose/refresh/rebalance, including any user installed applications (UIA) such as AppVolumes by VMware, Inc. These layering approaches retain the storage efficiency enabled by linked-clone based non-persistent designs while offering persistent design functionality to users.

However, the UIA capability available to non-persistent designs also introduces some compatibility risks. Whereas previously, the administrator was in a position to place users on the appropriate type of VDI desktop based on what type of applications they needed and whether their applications required a persistent machine identity, in the UIA enabled non-persistent designs it is entirely possible for users to themselves install an application of the type requiring a persistent machine identity and find out upon their next VDI login that the installed application won't function and throws errors related to the changed machine name of the new VM on which the user is placed.

SUMMARY

One or more examples described herein enable the creation and retention of a machine identity associated with a user for use on a virtual machine operated on a non-persistent desktop. A user logs into a VDI broker using a client device such as a laptop, computer interface, desktop, or other device. The VDI broker creates a machine identity if none exists, or retrieves the machine identity associated with the user from local or remote storage. The machine identity includes information such as a machine name, security identifier (SID), globally unique identifier (GUID), or other operating system-specific identity. The machine identity associated with the user is then saved after the user ends the session.

This summary introduces a selection of concepts in a simplified form that are described in more detail below. This summary is not intended to identify essential features, nor is it to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
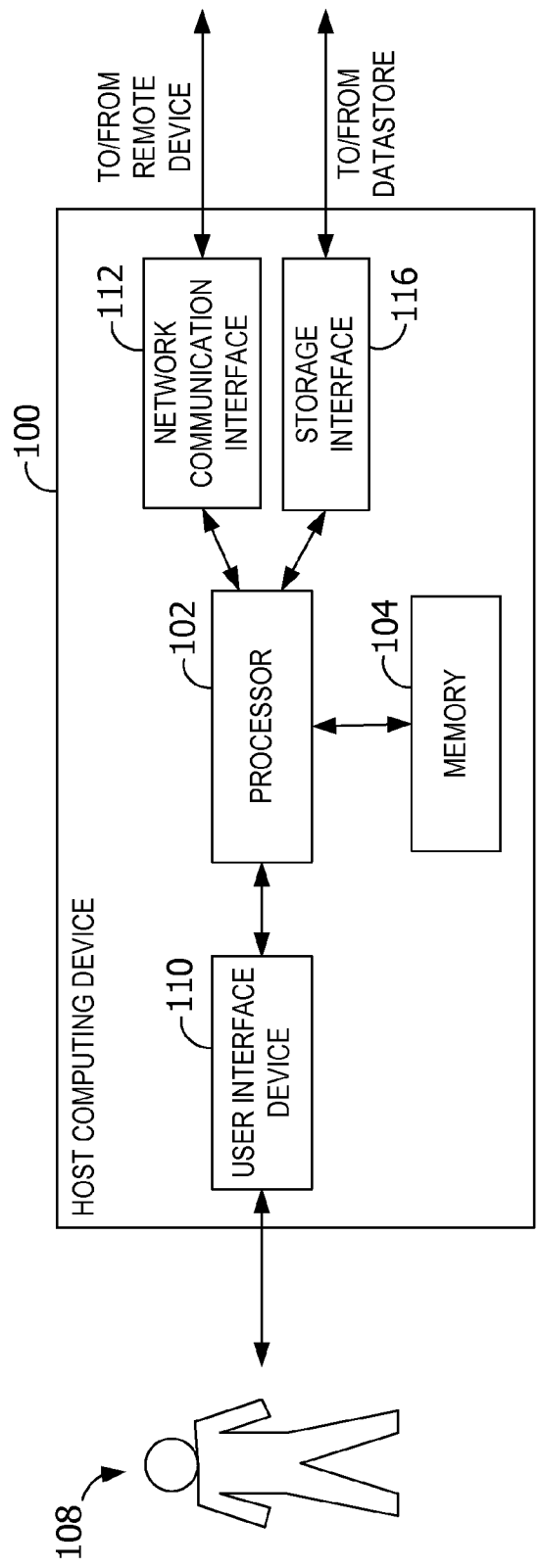
FIG. 1 is a block diagram of an example host computing device.

Aspects of the disclosure manage machine identity to accommodate installation of applications to provide, at least, a seamless and robust desktop experience to users in the context of non-persistent design with user-installed applications (UTA) enabled. Examples of the disclosure insert the same machine identity to a virtual desktop infrastructure (VDI) desktop, built on-demand using cloning, retrieved from a virtual machine (VM) pool, or forked using shared storage, with the result that users (e.g., always) receive a non-persistent VM which has the same machine name even though the underlying VM has changed. With the present disclosure, users can install more challenging applications in a non-persistent VDI design, including those that demand persistence of the machine identity.

While operable with any form of VM pool or VM creation, some examples of the disclosure leverage the high speed of a hot cloning functionality referred to as VMFork by VMware, Inc. to facilitate the insertion of a specific machine identity during the machine creation process that is coupled to the requesting user such that each time a user requests a desktop session on a non-persistent pool, a VM will be created using VMFork methods and the specific machine identity coupled to the requesting user will be inserted into the machine using guest customization operations.

Examples of the disclosure enable administrators to retain the benefits of a non-persistent VDI pool while providing the functional benefits of a persistent VDI pool. Layering technologies that allow preservation of user installed applications within a non-persistent pool now carry less risk because a broader range of applications can be properly handled with this invention. For example, a state may be restored to the child VM, where the state describes applications (some of which may require the same machine identity as when installed or activated). Some examples of the disclosure enable use of a new VM (on top of a built-on-demand or non-persistent strategy) yet still provide the user with user installed applications (UIAs). The disclosure provides a stable machine identity across sessions.

Virtual persistence helps hide the underlying VDI architecture, ensuring that users always have a seamless persistent user experience that offers broader application compatibility.

Some operations described herein are described in the context of forking operations, such as those provided by VMFork from VMware, Inc. Forking, and VMFork in particular, differs from linked clones for VM instantiation. Linked clones are a storage construct, whereas VMFork is a memory construct and a storage construct. VMFork uses linked clones but also has a COW memory strategy such that all content is initially shared and changes are tracked as COW memory pages for each child VM. For example, while some linked VM clones use small delta disks that reference a larger base disk of another VM, these systems lack a mechanism for online customization of the instantiated VMs (e.g., performed while the VMs are powered-on). For example, as linked VM clone functionality does not inherently include customization, some of the existing systems rely on offline domain join techniques (e.g., performed while the VMs are powered-off). As another example, these systems are unable to configure instantiated VMs with different states. Further, many guest operating systems require rebooting, or other operations with a high time cost, to set identities within the instantiated VMs due to restrictions at the operating system level.

VMFork enables hot cloning of virtual machines. At a high level, there is a notion of a parent VM which is loaded in memory within the hypervisor but no longer executing. The parent goes into this special suspended state when a command is issued to the hypervisor from a script running inside the parent VM itself. At some future point, a command is issued to the same hypervisor to 'Fork a Child VM' which results in a new VM definition being created on the hypervisor but which initially shares all of its memory pages with he suspended VM parent. The child starts executing at the point where the parent VM was frozen which means it will be continuing to execute the script that was the cause of the parent VM being suspended. The next operations in this same script typically do some cleanup work to prepare the child VM for usage such as cycling the network interface card (NIC) driver in order to pick up the new media access control (MAC) address and obtain a valid Internet Protocol (IP) address by dynamic host configuration protocol (DHCP).

VMFork based VDI provisioning quickly creates child VMs. A child VM can be created in a little as 1 second in some operating systems and even with the overhead of addition tasks operating in other operating systems, complete provisioning may occur within 3-4 seconds. The workflow for VMFork based provisioning avoids all reboots of the machine yet is able to assign each child VM its own machine identity. The VM is 'Forked' early enough in the boot up process on the parent VM that it is before certain elements of the operating system (OS) have initialized and it is therefore possible to pass in the desired machine identity information right after the child VM is created in a way that is consistent with what the OS expects during a normal boot sequence. The dynamic insertion of the machine identity info such as machine name is part of the provisioning process which itself completes in seconds. This dynamic insertion capability that is part of the new VMFork based provisioning technology enables persistence of user installed applications within a non-persistent VDI design.

A user who authenticates to a conventional VDI broker may wait perhaps 5 seconds before receiving access to their virtual desktop. However, examples of the disclosure enable creating a virtual desktop fully on demand in response to the user's request for a session within this 5 second window. This means that there is now an opportunity to insert a static machine identity into the VM based on the identity of the requesting user such that the resultant machine will always have the same machine identity even though it is a new VM.

'Virtual Persistence' may be described as a logical abstraction layout between VM and the OS machine identity that ensures a stable machine identity for users each time they access a desktop within a non-persistent pool. The actual machine identity chosen for a given user may either be assigned manually by an administrator ahead of first use of the non-persistent pool, or it could be randomly assigned at first use of the pool and persisted thereafter by way of the 'Virtual Persistence' mechanism. Upon assignment, the key machine identity element bound to a given user is persisted in a database or lightweight directory access protocol (LDAP) mechanism for later lookup. Upon requesting a desktop session at some future time, the user's identity drives a lookup to the LDAP or database mechanism and the key identity elements are inserted into our new VMFork based machine creation process.

The key machine identify elements inserted, in some examples, include: 1) machine name, 2) configuration settings (e.g., Active Directory) machine account information, 3) GUID or SID, and/or the like. By restoring these elements during machine creation, the process implements 'Virtual Persistence' between users and the identity of their virtual desktop even though the underlying VDI pool remains non-persistent and VMs themselves are ephemeral and will be destroyed at the end of the user's session.

Virtual Persistence is an on-demand virtual desktop creation design whereby the OS machine identity is inserted to the virtual desktop based on the identity of the calling user in such a way that users obtain a more fully persistent desktop experience atop an underlying non-persistent pool. Unlike a true persistent VDI design where users are always directed back to the same actual VM, Virtual Persistence as enabled by the operations described herein allows users to be directed to a newly created VM which contains the same machine identity information across sessions. VMFork provisioning technology offers provisioning speed to avoid introducing appreciable delays between the user's request for a desktop session and their access to same.

In the context of user installed applications (UIA) functionality within non-persistent pool design, Virtual Persistence allows users to install a greater range of applications with less risk of incompatibilities even for challenging applications that need to see the same machine name each time they are launched. With the disclosure, such applications simply function properly as intended because the machine name is set to be the same as it was when the user first installed it, even though the underlying VM container has changed.

Virtual Persistence helps further bridge the gaps of the past between a traditional persistent VDI VM and the more efficient non-persistent desktop designs. It helps administrators retain the efficiencies of a non-persistent design while offering users a more seamless persistent desktop experience that encompasses even applications that have failed in past non-persistent designs. This abstraction layer between the VM and its OS identity offers new flexibility and helps mask the underlying VDI architecture from the user.

Some aspects of the disclosure are operable with pre-built VMs (e.g., no VMFork). Some aspects of the disclosure are operable with VMs built on demand (e.g., with VMFork). In either group of examples, the VMs are customized, on the fly, on demand, in response to criteria. Example criteria or stimulus include the user logging into a virtual desktop infrastructure (VDI) broker or other identity asset repository. The VDI broker communicates the user identity information to the guest customization process or component to enable customization of the VM.

Aspects of the disclosure ensure virtual persistence, reduce the amount of data processing on the host, increase the speed of the host and other devices, reduce an amount of data being transferred over a local area network (LAN) and/or a wide area network (WAN), improve the functioning of the host itself, use less memory, reduce power consumption (use of memory takes power), reduce processor load, reduce network bandwidth usage, improve operating system resource allocation, and/or increase efficiency.

Example operations associated with the insertion of a user-specific machine identity into a VM are described in the context of a virtualized environment, such as next described with reference to FIG. 1.

FIG. 1 is a block diagram of an example host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 includes one or more random access memory (RAM) modules, flash memory modules, hard disks, solid-state disks, and/or optical disks. In FIG. 1, memory 104 refers to memory and/or storage. However, in some examples, memory 104 refers only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108.

In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
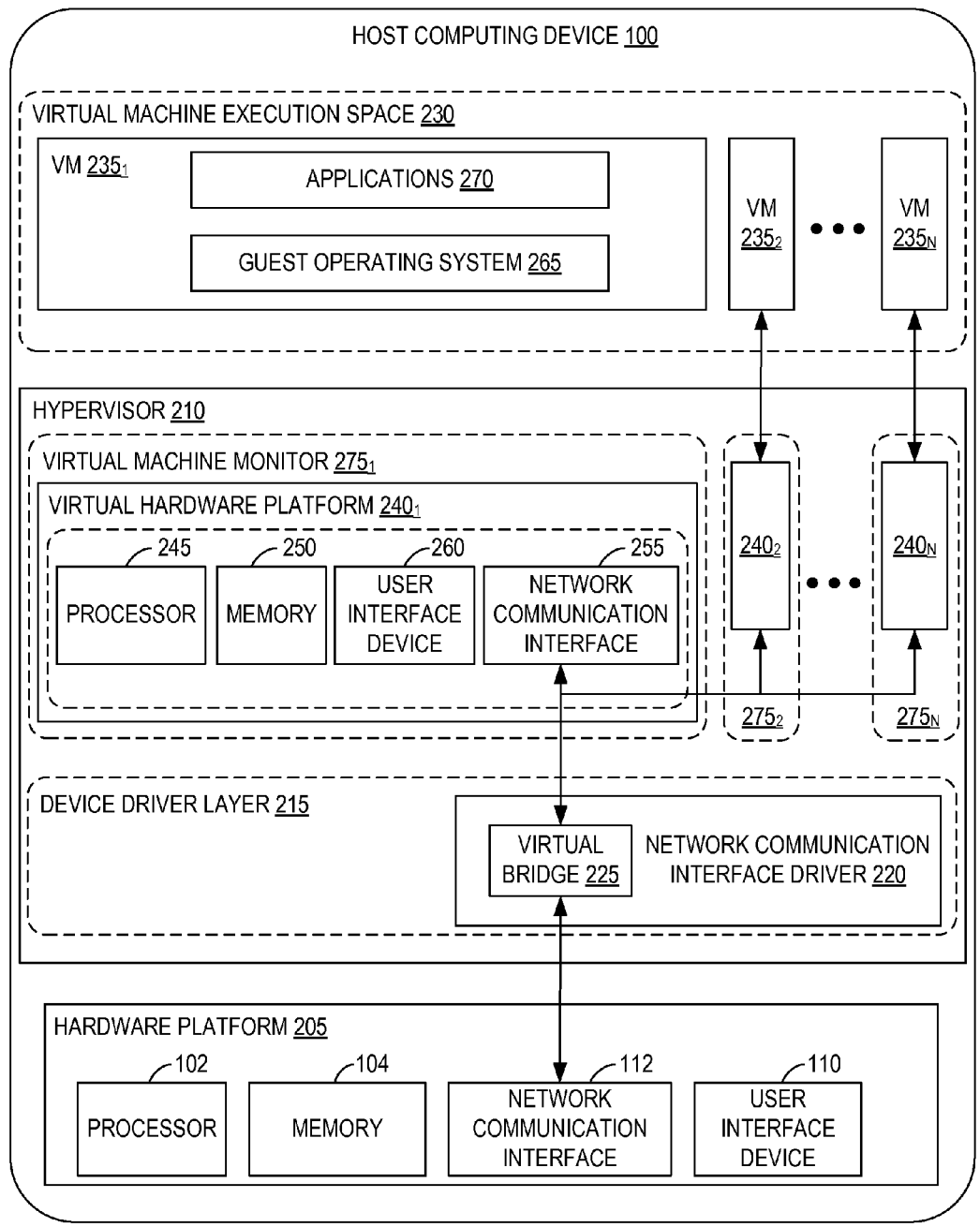
FIG. 2 is a block diagram of example virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor 102 and a memory area 104. The processor 102 includes any quantity of processing units, and is programmed to execute computer-executable instructions for implementing aspects of the disclosure. The instructions may be performed by the processor 102 or by multiple processors 102 executing within the computing device, or performed by a processor external to computing device. In some examples, the processor 102 is programmed to execute instructions such as those illustrated in the figures.

The memory area includes any quantity of computer-readable media associated with or accessible by the computing device. The memory area, or portions thereof, may be internal to the computing device, external to the computing device, or both.

Figure 3:
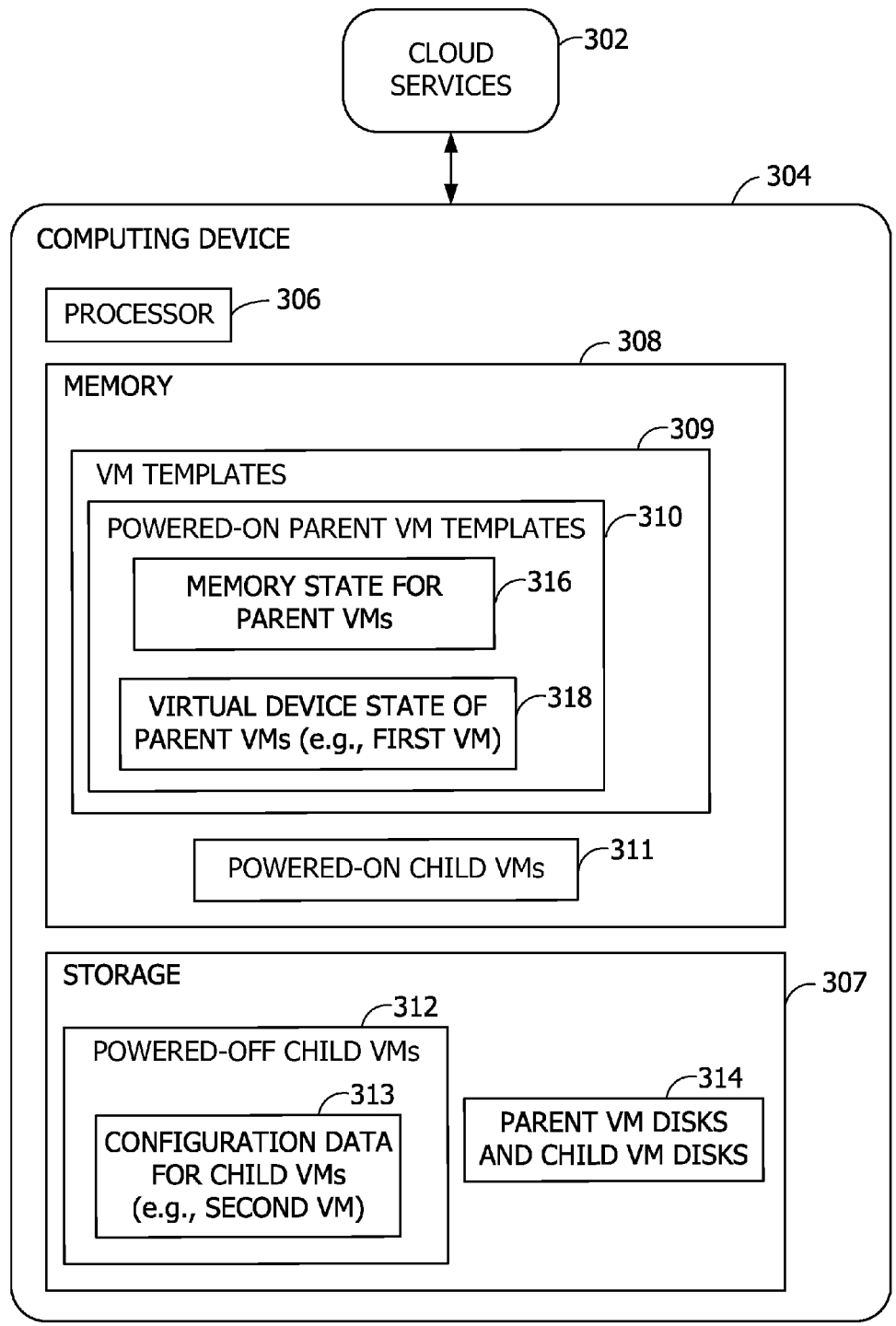
FIG. 3 is a block diagram of an example system that creates, stores, and retrieves child VMs.

FIG. 3 is a block diagram of an example system that utilizes cloud services to create, store, and retrieve child VMs. In the example of FIG. 3, a computing device 304 is in communication with cloud services 302. The computing device 304 includes a processor 306, memory 308, and storage 307.

The memory 308 stores a plurality of VM templates 309. In some examples, VM templates 309 are arranged in a hierarchy, such as a tree hierarchy. However, aspects of the disclosure are operable with VM templates 309 stored in any structure. In such examples, VM templates 309 include a plurality of powered-on parent VM templates 310. The powered-on parent VM templates 310 may be created and maintained by computing fabric cloud service and/or by cloud services 302, or by any other computing device 304. The parent VM templates 310 may be classified, categorized, or otherwise described as derived VM templates and standalone VM templates. Derived VM templates are derived from one of the parent VM templates 310, and inherit one or more disk blocks (e.g., "common" disk blocks) from that corresponding parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

In some examples, each parent VM template 310 includes a virtual device state 318 for one of VMs 235 (shown in FIG. 2) and a memory state 316 for that VM 235. Memory 308 further stores data describing a plurality of powered-on child VMs 311.

In some examples, cloud service 302 specifies whether to create a standalone template or a derived VM template (e.g., from another parent VM template 310). Cloud service 302 also creates a defined quantity of registered (e.g., to the cloud operating system) but powered-off child VMs 312 using the createChildren( ) function call. The createChildren( ) function call also takes as input a childProperties argument which defines, for example, the identities (e.g., hostname, IP/MAC address, etc.) and particular processor and/or memory sizes of the powered-on child VMs 311. If the sizes are different from that of parent VM template 310, computing fabric cloud service may either add those resources when powering on child VM 311 (e.g., a "hot add") or create a new parent VM template 310. In addition, the childProperties argument also specifies how the created child VM behaves when powered-on and/or reset. For example, when powered-on the powered-off child VM 312 may act as an ephemeral entity that returns to the same, original parent state, or a regular VM that goes through a usual boot process.

In the execution phase, powered-off child VMs 312 are instantiated using the powerOnChildren( ) function call. The powerOnChildren( ) function call leverages fast VM instantiation techniques, such as those as described herein, to quickly spawn VMs with minimal processor overhead. Powered-on child VMs 311 may also be powered off or reset using the powerOffChildren( ) function call and the powerResetChildren( ) function call.

In contrast to memory 308, the example storage 307 includes one or more disks. For example, the storage 307 stores data describing a plurality of powered-off child VMs 312. Each of the powered-off child VMs 312 is instantiated, on demand, from one of the plurality of parent VM templates 310. Until then, powered-off child VMs 312 use no memory resources. For example, powered-off child VMs 312 are present in storage 307 and, when powered-on, the powered-on child VMs 311 share memory pages with powered-on parent VM templates 310 and enter into memory 308, and the writes of the powered-on child VMs 311 are entered into memory 308 as COW.

Child VMs have one or more properties, characteristics, or data associated therewith. Example child VM properties include, but are not limited to, hostname, IP address, MAC address, domain identity, processor size, and/or memory size. In some examples, the child VM properties for each child VM (e.g., second VM) may be referred to as configuration data 313. Storage 307 further stores parent VM disks and child VM disks 314 (e.g., .vmdk files) for use by VMs 235.

After instantiation, powered-off child VMs 312 are registered to a cloud operating system. The cloud operating system is executed by the computing device 304. Registration of one of the powered-off child VMs 312 includes identifying the powered-off child VM 312 to the cloud operating system, and occurs before the powered-off child VM 312 is powered on or otherwise executed. In this manner, the powered-off child VM 312 is said to be pre-registered with the cloud operating system. In some examples, the cloud operating system is the hypervisor 210. By registering the powered-off child VMs 312, the cloud operating system is no longer in the critical path when cloud services 302 commission VMs 235, thus reducing the amount of time needed for child VMs to become available. However, aspects of the disclosure are also operable with registration occurring on the child VM instantiation path.

In some examples, configuration data 313 for the child VM is defined, created, received, and/or registered prior to receiving a request to fork the child VM (e.g., from a management level application). In other examples, configuration data 313 is defined in response to receiving the request to fork the child VM. Configuration data 313 may be defined from default values set by an administrator, received in the request from the management level application, and/or populated with data from other sources. Example configuration data 313 for a child VM includes an IP address, a MAC address, a hostname, a domain identity, a set of attributes, and/or any other state data to be applied when customizing the identity of the powered-on child VMs 311.

In some examples, configuration data 313 is stored in a file such as a .vmx file, with one file per powered-on child VM 311 or powered-off child VM 312. Configuration data 313 may be registered with virtualization software, such as the cloud operating system.

In some examples, the computing device 304 defines a virtual device state of the child VM 311 based on virtual device state 318 of the parent VM template 310. For example, defining the virtual device state of the child VM 311 includes copying virtual device state 318 from the parent VM template 310. As another example, defining the virtual device state of the powered-on child VM 311 or powered-off child VM 312, collectively child VM 311 or 312, includes creating a COW delta disk referencing virtual device state of the parent VM template 310. Alternatively, the virtual device state depends, for example, on criteria associated with user 108 (e.g., user criteria), the system capabilities or the applications the child VM is running.

The computing device 304, in some examples, defines, creates, receives, and/or registers persistent storage for the child VM 311 or 312 based on persistent storage (.vmdk) of the parent VM template 310. In some examples, persistent storage for the child VM 311 or 312 is stored in a file, such as a .vmdk file. For example, defining the persistent storage for the child VM 311 or 312 includes referencing persistent storage of the parent VM template 310. In some examples, referencing persistent storage of the parent VM template 310 includes creating a read-only base disk referencing persistent storage of the parent VM template 310, and creating a COW delta disk (associated with the child VM) to store changes made by the child VM to the base disk.

In some examples, computing device 304 defines, creates, receives, and/or registers memory 308 for the child VM 311 or 312 based on memory 308 of the parent VM template 310. In some examples, referencing memory of the parent VM template 310 includes creating COW memory (associated with the child VM) to store changes made by the child VM to memory of the parent VM template 310. In this manner, the child VM 311 or 312 shares memory state of the parent VM template 310 with COW memory pages, in contrast with linked clones that use COW delta disks.

The computing device 304 executes (e.g., powers on) the powered-off child VM 312, which becomes powered-on child VM 311. Execution of the powered-off child VM 312 includes configuring an identity of child VM 311 or 312 using configuration data 313. In some examples, execution of the powered-off child VM 312 includes configuration and execution of a boot process (or bootup process) to access and apply configuration data 313 to the powered-off child VM 312. In this manner, child VM 311 or 312 customizes itself during bootup. The now-executing powered-on child VM 311 has a virtual device state that is a copy of virtual device state 318 of the parent VM template 310, with persistent storage referencing persistent storage of the parent VM template 310.

In some examples, the bootup process is executed by a guest operating system 265 (shown in FIG. 2) on child VM 311 or 312. The bootup process includes, for example, a command to perform a synchronous remote procedure call (RPC) to the cloud operating system to obtain and apply configuration data 313. An example format for the RPC is "rpc 'info-get'".

The forked child VM 311 or 312 may be configured in different ways, dependent in part on a type of guest operating system 265 executing on child VM 311 or 312. One example for configuring an identity of the child VM 311 or 312 is next described.

In some examples of the disclosure, the boot process applies customization to the powered-on child VM 311. The boot process includes a blocking agent that prevents the child VM 311 or 312 from completing bootup until certain operations have completed. For example, the blocking agent is injected into the boot process to prevent the guest operating system 265 on the child VM 311 or 312 from accepting user-level commands until the identity of the now powered-on child VM 311 has been configured.

The powered-on child VM 311, in some examples, accesses configuration data 313 which specifies a domain identity to be applied to the powered-on child VM 311. The domain identity is one of a plurality or pool of previously-created domain identities available to the child VM 311. The plurality of domain identities are created, for example, by an administrator before the virtual device state of the child VM 311 and the persistent storage of the parent VM template 310 are defined.

The domain identity is pre-selected (e.g., explicitly identified in configuration data 313) in some examples, or selected during execution of the bootup process (e.g., based on characteristics of executing powered-on child VM 311). The specified domain identity is from the pool of previously-created identities. Then the obtained domain identity is applied to the powered-on child VM 311. In some examples, applying the obtained domain identity includes performing an offline domain join operation, or any method that allows a computer system to join a domain without a reboot.

In operation, preparing the parent VM template 310 may be performed, for example, by a guest agent residing inside a guest operating system 265 of the parent VM template 310. The guest agent issues a fork command to quiesce the parent VM template 310 into the ready-to-fork state at an appropriate boot stage of the parent VM. As provisioning operations are initiated, the one or more powered-on child VMs 311 are forked without a committed identity. As the boot process continues inside each powered-on child VM 311, the various identities are applied to the powered-on child VMs 311. For example, due to the forking process as described herein, a copy of the guest agent from the parent VM template 310 appears in each powered-on child VM 311. The copy of the guest agent resumes execution inside each powered-on child VM 311 as part of the boot process of the guest operating system 265. In this post-fork stage, for each child VM 311 or 312, the guest agent obtains (e.g., from a data store available to the guest operating system 265 of the child VM 311 or 312) and applies one or more identities to the child VM 311 or 312. For example, the identities, or other parameters are stored as part of configuration data 313 in a .vmx file, or other file stored by the cloud operating system and accessible via API from within the guest operating system 265. In operation, the guest operating system 265 synchronously requests and receives one of the identities from the cloud operating system to perform an offline domain join (e.g., update the identity in place) before proceeding through the tail end of the bootup process (e.g., before the system launches the logon service).

The operations discussed above may be embodied as computer-executable instructions stored on one or more computer-readable media. The instructions, when executed by processor 306, configure an identity of a forked VM 235 based on a pool of available domain identities.

The forking and state customization operations illustrated and described may be implemented using templates and API to configure and deploy the powered-on child VM 311 in response to a request from cloud service 302. In an example of such examples, computing device 304 creates and maintains a hierarchy of parent VM templates 310 and child VMs 311 or 312, in some examples. For example, computing device 304 maintains a set of powered-on parent VM templates 310 and a set of powered-off child VMs 312. Parent VM templates 310 are created, in some examples, in response to a request from at least one of cloud services 302. Alternatively or in addition, parent VM templates 310 are created on demand by computing device 304 after detecting patterns in VM 235 provisioning requests from cloud services 302. Maintaining the set of parent VM templates 310 includes, for example, powering-on each of parent VM templates 310. Each child VM 311 or 312 is instantiated from one of parent VM templates 310 in response to a request for the child VM 311 or 312. Maintaining the set of child VMs 311 or 312 includes, for example, pre-registering each instantiated child VM 311 or 312 to the cloud operating system (e.g., before being initiated or otherwise powered-on). Alternatively or in addition, one or more of cloud services 302 may create and maintain one or more of parent VM templates 310.

In the teardown phase, parent VM templates 310 and child VMs 311 or 312 may be destroyed using the destroyParentTemplate( ) and destroyChildren( ) function calls. Depending on whether parent VM template 310 is part of the template hierarchy (e.g., a derived VM template) or a standalone template, destroying the template may leave some of it on the disk. The destroyChildren( ) function call turns off child VM 311 (e.g., power down) and resets the child VM 311 or 312 properties such as identity, etc.

In automatic mode, rather than have parent VM templates 310 be explicitly created via the function calls available in manual mode, parent VM templates 310 are automatically generated based on demand. For example, cloud service 302 uses the createChildrenAuto( ) function call to create child VMs 311 or 312. When a particular type of child VM 311 or 312 is requested repeatedly (e.g., a plurality of requests are received for the same type of child VM 311 or 312), computing fabric cloud service creates a new powered-on parent VM template 310, deriving it from the appropriate parent VM template 310 in the hierarchy. This optimization further simplifies the setup and teardown phases by eliminating the need for cloud services 302 to explicitly create, destroy, and otherwise manage parent VM templates 310. In some examples, the new parent VM template 310 is created only if additional requests are expected for such VMs. For example, if the request for a particular VM 235 is a one-off request, the new parent VM template 310 is not created.

VM instantiation operations are performed on VMs 235 stored in one or more datastores. Example VM instantiation operations include, but are not limited to, cloning, copying, forking, and the like. VM instantiation operations may be performed by virtualization products such as VMware's ESX brand software (e.g., in a kernel layer). In some examples, VM instantiation operations implement fast-suspend-resume technology with COW page references (e.g., rather than handing over pages entirely). While described in some examples herein with reference to VM forking routines, those of ordinary skill in the art will note that the disclosure is not limited to these VM forking routines. Rather, the disclosure is operable with any fast VM instantiation routines.

Figure 4:
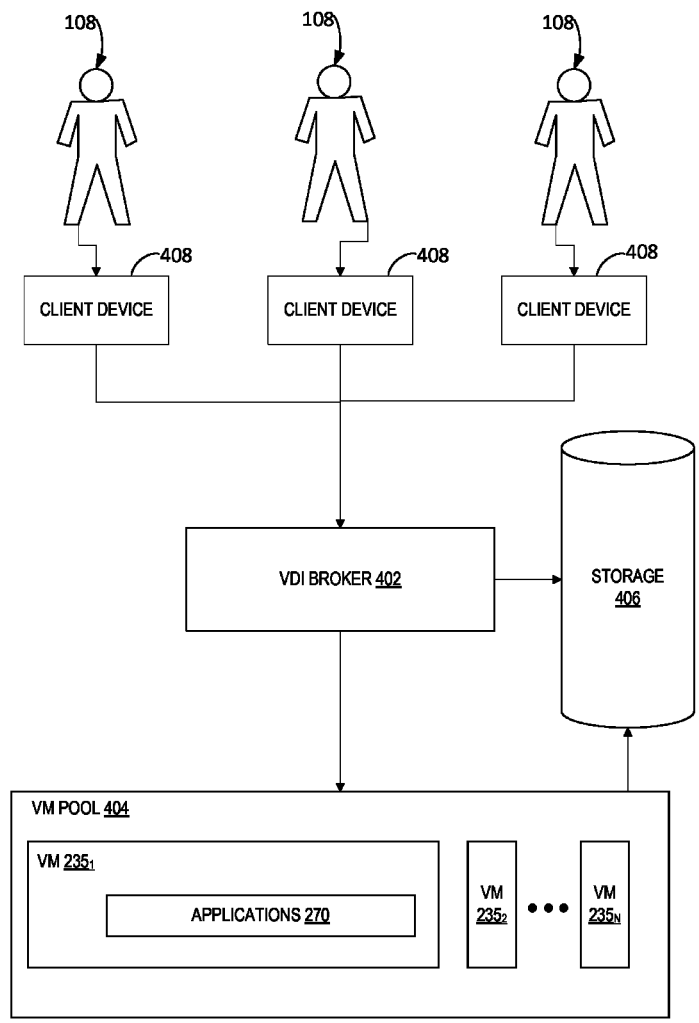
FIG. 4 is block diagram of an example system that retrieves a machine identity associated with a user.
Figure 5:
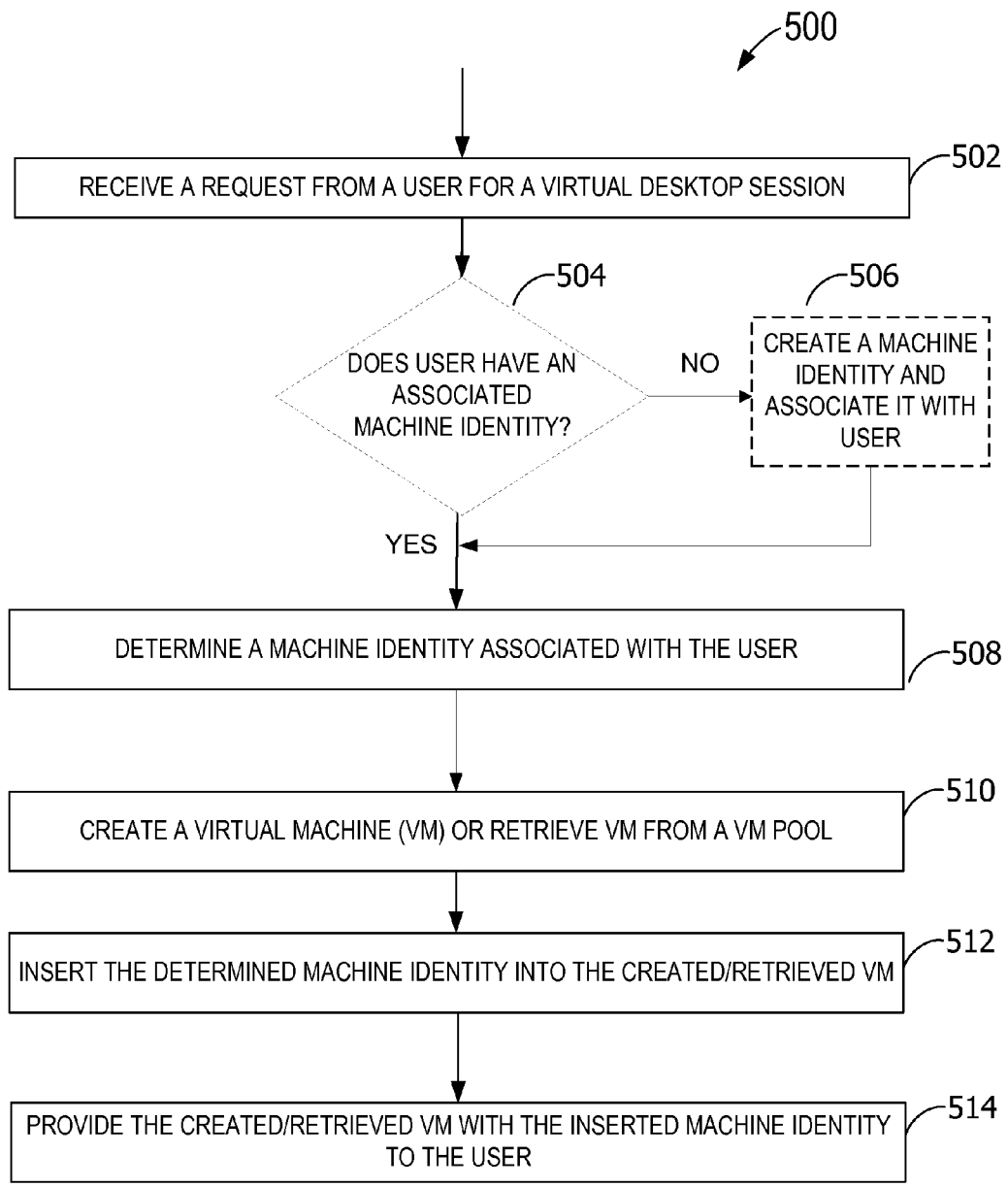
FIG. 5 is a flowchart of an example method of retrieving or creating a machine identity and associating it with a user for use on a VM.

FIG. 4 is block diagram of an example system for retrieving a machine identity associated with a user. Users 108 access the system through client devices 408. Client devices 408 include any device which permits the user to access the system, for example a desktop, a laptop, a tablet, or other host computing device. Users 108 connect to a VDI broker 402 through client devices 408. In the example illustrated in FIG. 4, three users 108 access the system. The VDI broker 402, for example View Broker by VMWare, Inc., retrieves the machine identity associated with user 108 from storage 406. The VDI broker 402 and VM pool 404 both have access to storage 406. In some examples, storage 406 is local. Additionally or alternatively, storage 406 is remote. In FIG. 4, VDI broker 402 and VM pool 404 access the same storage 406; however, in other examples storage 406 is not shared, or shared only by some elements in the system. VDI broker 402 communicates with VM pool 404. The VDI broker 402 responds to user 108 logging into the system. The VDI broker 402 communicates between user 108 and VM pool 404 to provide user 108 with a VM 235. VM 235 is tied to a machine identity associated with user 108 which is retrieved on request from storage 406, as illustrated in FIG. 5 and described below. The VDI broker 402 also updates the machine identity as user 108 customizes his or her VM 235 saving the updated machine identity to storage 406.

The VDI broker 402 is, in the example of FIG. 4, connected to a VM pool 404. In the example illustrated by FIG. 4, there are pre-built VMs 235 in the VM pool 404. These pre-built VMs 235 facilitate a shorter wait time between user 108 request for a VM 235, and delivery of the VM 235, associated with the machine identity of user 108, to user 108.

VDI broker 402 also accesses usage rules, in some examples. Usage rules include, for example, hours during which user 108 is permitted to access the system, amount of processing or memory resources user 108 is entitled to, applications 270 user 108 is permitted to install, etc. Alternatively, these usage rules are associated with the machine identity assigned to user 108.

In other examples, VDI broker 402 is not connected to a VM pool 404, rather it is connected to a computing device 304 which contains VM templates 309 as illustrated in FIG. 3. In that example, as user 108 requests a VM 235 the host computing device 304 creates a child VM 311 from the parent VM template 310. The child VM 311 is created through any method known in the art, for instance by cloning, or by forking.

FIG. 5 is a flowchart of an example method 500 of retrieving or creating a machine identity and associating it with a user for use on a VM. At 502 a request is received by the VDI broker 402 to initiate a virtual desktop session for a user 108. The request is triggered by the user 108 logging into the client device 408, for example. In other examples, the request is generated by a system administrator, or is made in anticipation of a shift change when multiple users 108 will log on.

A machine identity associated with the user 108 is determined at 508. As shown at 504, in some examples, the VDI broker 402 optionally determines whether or not the user 108 already has and/or is associated with a machine identity. In some examples, the user 108 will not have a machine identity, for example if it is the first time the user 108 has used the system. If a machine identity does not exist for the user 108, the VDI broker 402 creates a machine identity for that user 108 and associates the created machine identify with the user 108 at 506. If the user 108 has and/or is associated with a machine identity, the VDI broker 402 retrieves the machine identity associated with the user 108 from storage 406. The machine identity is stored locally in some examples, externally or at a central repository in other examples. The machine identity is stored, in the illustrated example, on a database. It is stored, in other examples, on a Lightweight Directory Access Protocol (LDAP) directory.

The machine identity contains, in some examples, a machine name associated with the user 108, an Active Directory accounts, an SID or Windows brand operating system GUID or another unique identifier. The machine identity varies depending on the operating system (OS). For instance, the attributes which make up the machine identity vary for Windows, Linux, or MAC, and the machine identity reflects those attributes. Further, the machine identity, in some examples, contains rules for the user 108 to access the system. For instance, in some examples, the machine identity contains rules prohibiting the user 108 to access certain directories, to access the system during certain hours, or it prevents the user 108 from editing various files. Further, the machine identity in some examples maintains information about the applications 270 installed or utilized by a user 108. In some examples, this includes license keys and application-specific user preferences. While the initial user desktop is selected when the user 108 first requests a desktop from the VDI broker 402 (e.g., before the user 108 ever logs into the desktop for the first time), when the user 108 installs an application, configuration data (e.g., a registry or other file or database) is updated to include references to the machine identity of the user 108. The reference to the machine identity is, in some examples, persisted in a standard profile stored on a network or elsewhere such as on a user disk serviced by AppVolumes by VMware, Inc. The application reads the machine identity each time the application queries the operating system.

A VM 235 is then identified. For example, in some examples, the VM 235 is created or retrieved from a VM pool 404 for the user 108 at 510. In some examples, the computing device 304 is associated with a VM pool 404. In this example, the VDI broker 402 inserts the machine identity into a VM 235 retrieved from the VM pool 404. However, in other examples, the VM 235 is created by cloning or forking a parent VM template 310, through a process such as VMFork by VMWare, Inc. At 512, the machine identity is inserted into the created or retrieved VM 235, and the VM 235 is provided to the user 108 at 514.

Figure 6:
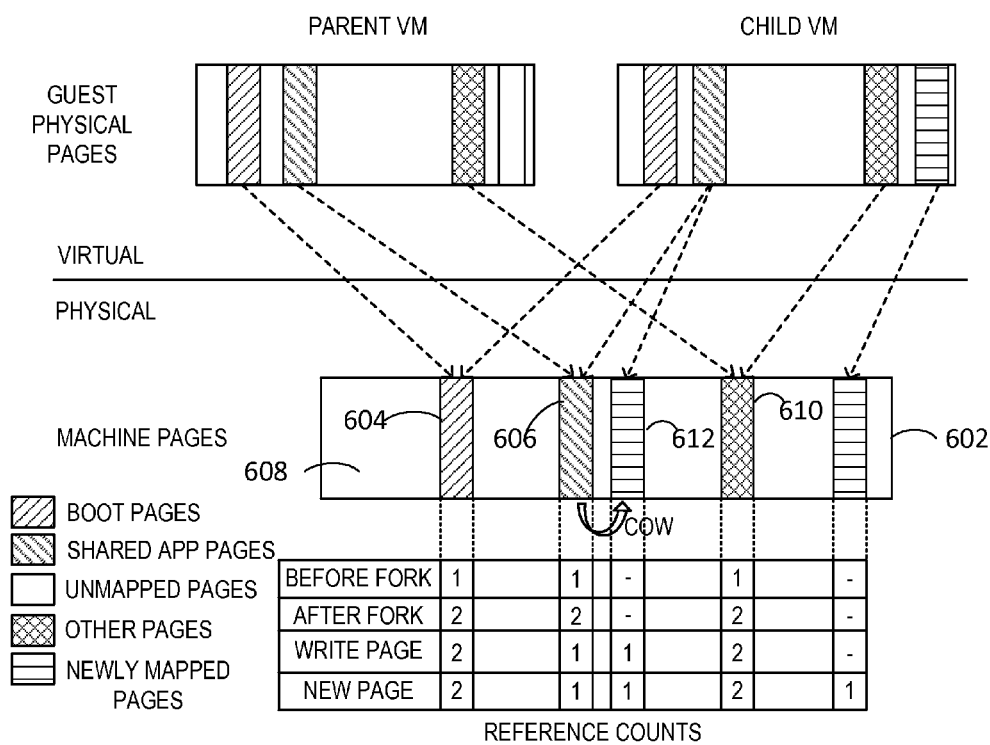
FIG. 6 is a block diagram illustrating the interrelation between example forked child and parent VMs and their associated storage.

FIG. 6 is a block diagram illustrating the usage of a forked parent VM template 310 and child VM 311 or 312 of common and exclusive machine pages. The relationship of the virtual and physical aspects of the disclosure are represented. A parent VM template 310 and a child VM 311 or 312 reside in the virtual space. Both the parent VM template 310 and the child VM 311 or 312 access machine pages 602 that are located on physical storage 307.

Five types of regions are illustrated on the machine pages 602. The first type of machine pages illustrated are boot pages 604 (illustrated with lines slanting upwards from left to right). Shared application pages (shared app pages) 606 are illustrated with lines slanting downwards from left to right. Unmapped pages 608 are illustrated by white area on the machine pages 602. Other pages 610 created by the VMs are illustrated by cross-hatches. Newly mapped pages 612 are illustrated by horizontal lines.

FIG. 6 illustrates the sharing of common pages between parent VM templates 310 and the child VM 311 or 312. In the example of FIG. 6, before the child VM 311 or 312 is created (also referred to as "before fork") the only existing pages are the boot pages 604, shared app pages 606, and other pages 610. The only VM which is using those pages is the parent VM, so the "reference counts" for those pages is 1. The parent VM template 310 is then forked, creating a child VM 311 or 312. After the fork occurs, two VMs point to the boot pages 604, the parent VM template 310 and the child VM 311 or 312. Likewise, both the child VM 311 or 312 and the parent VM template 310 point to the shared app pages 606 and the other pages 610 after the fork. Consequently, each of these pages has a reference count of 2, in this example, as both the child VM 311 or 312 and the parent VM template 310 are pointing to them. In another example, there could be more reference counts to these pages if more child VMs 311 or 312 are created.

After forking, but before creating any new content, the child VM 311 or 312 has no independent pages, but rather relies on the stored pages of the parent VM template 310. The computing device 304 tags, marks, configures, or otherwise indicates that persistent storage of the parent VM template 310 is COW. Tagging the persistent storage 307 and memory 308 of the parent VM template 310 as COW prevents the parent VM template 310 from modifying persistent storage 307 or memory 308 that the child VM 311 or 312 is relying upon. Instead, if the parent VM template 310 attempts to modify either persistent storage 307 or memory 308, a copy of that data is created for the parent VM template 310 leaving the original persistent storage 307 or memory 308 intact.

Once the child VM 311 or 312 writes, it creates its own copy of a page, a copy on write (COW) version of that page. In the example of FIG. 6, the child VM 311 or 312 writes to the shared app pages 606, thus creating a COW page, the newly mapped page 612 in the figure. Once this new write has occurred, the parent VM template 310 still points to the shared app pages 606, but the child VM 311 or 312 now points to its newly mapped page 612. FIG. 6 reflects that after the COW pages are created, the child VM 311 or 312, in this example, does not point to the shared app pages 606 of the parent VM template 310, and thus the reference count for the shared app pages 606 drop to 1. The reference counts for the newly mapped pages 612 increase to 1, since the child VM 311 or 312 created that new page and now points to it. The reference counts for the boot pages 604 and the other pages 610 remain at 2, since in the example illustrated both the child VM 311 or 312 and the parent VM template 310 still point to those pages.

After the child VM has created a newly mapped page 612 it writes that page to the physical machine pages 602. After that newly mapped page 612 is written, there is one reference to it, by the child VM 311 or 312. In the example of FIG. 6, there are two newly mapped pages 612 created.

The first newly mapped page 612 is a modification of an existing page stored by the parent VM template 310. In some examples, the newly mapped page 612 points back to the shared app pages 606 which it modifies, and only the changes made by the child VM 311 or 312 to the shared app pages 606 are recorded on the newly mapped pages 612. In other examples, the child VM 311 or 312 no longer relies on the parent VM template 310 for the modified shared app pages 606, and instead the child VM 311 or 312 only utilizes its newly created page.

The second newly mapped page 612 is original content created by the child VM 311 or 312. That newly mapped page 612 does not indicate that it is a modification of any previously existing page. Instead, that newly mapped page 612 is solely tied to the child VM 311 or 312, and only the child VM 311 or 312 references it.

In the present disclosure, upon request by a user 108 or other initiating event, a machine identity associated with the user is inserted into the child VM 311 or 312. The child VM 311 with the inserted machine identity is presented to the user 108. The machine identity installed on the child VM 311 or 312 ensures that the user 108 has an experience which is consistent between virtual desktop sessions. For example, the user 108 will maintain license keys associated with applications the user 108 is utilizing as part of the machine identity of the user 108. Consequently the user 108 will not be required to reinstall applications on subsequent use, or select preferences each time upon login. Rather, this data, in some examples, is saved as part of the machine identity.

VMFork

VMFork differs from linked clones for VM instantiation. Linked clones are only a storage construct, whereas VMFork is a memory construct and a storage construct. VMFork uses linked-clones but also has a Copy-on-Write memory strategy such that all content is initially shared and changes are tracked as Copy-on-write memory pages for each child VM. For example, while some linked VM clones use small delta disks that reference a larger base disk of another VM, these systems lack a mechanism for online customization of the instantiated VMs (e.g., performed while the VMs are powered-on). For example, as linked VM clone functionality does not include customization, some of the existing systems rely on offline domain join techniques (e.g., performed while the VMs are powered-off). As another example, these systems are unable to configure instantiated VMs with different states. Further, many guest operating systems require rebooting, or other operations with a high time cost, to set identities within the instantiated VMs due to restrictions at the operating system level.

VMFork based desktops have something unique unlike any existing VDI desktop—it entails the ability to know at the hypervisor level which memory pages in the desktop VM are shared and which are unique. The VMFork parent VM initially shares all its memory pages with child VMs. Each memory page changed by the child VM is called a copy-on-write or 'COW' memory page. Thus for VMFork based VMs, a suspend operation by the hypervisor could write only these COW memory pages to disk rather than the full memory space of the VM. So long as the VMFork parent remains resident in memory on each ESX host, a resume operation can load only the COW pages back into memory and re-attach them to the VMFork parent logically. This is a form of logical deduplication. The VM is powered on by logically merging it with the contents of the replica on the fly, presenting what looks like standalone disk and memory image for each VM.

VMFork based desktops initially share all of their memory pages but over time as users conduct their desktop activities, more COW memory pages will be generated. For shorter running sessions or sessions where only a few applications are used, the percentage of memory pages that remains shared with the VMFork parent remains high (e.g., over 90%).

While described with reference to VMFork in some examples, those skilled in the art will note that any infrastructure, operations, components, and/or configuration of hardware, software, and/or firmware implementing the operations (or their equivalents or variations) described herein are within the scope of the disclosure. For instance, the VMs are provided in alternative examples from a VM pool, or through cloning as it is known in the art.

Aspects of the disclosure apply to any operating system capable of hosting virtual desktops, including server operating systems and desktop operating systems.

Examples described herein fork and configure live child virtual machines (VMs) from a powered on parent VM with underlying memory and disk resource sharing. In some examples, a script is executed to customize a state of each new forked VM to produce a child VM with a different state than the parent VM. For example, based on a virtual device state of a suspended parent VM (e.g., a first VM), a virtual device state of the child VM (e.g., a second VM) is defined. Persistent storage of the child VM is also defined based on persistent storage of the parent VM.

Examples described herein further configure a state of each newly-instantiated child VM based on configuration data for the child VM, including configuring one or more identities on the fork path. The identities are configured without involving a reboot of the child VM, despite any guest operating system level restrictions requiring reboot operations when configuring identities. Rebooting the child VM prevents the memory page sharing achieved by the forking operations described herein at least because the memory page sharing would be lost with the reboot. In this manner, aspects of the disclosure are operable to "instantly" provision child VMs. Further, eliminating reboot operations reduces overall provisioning time, which reduces overall cost of ownership for users. The level of boot storm is also significantly reduced when customizing large quantities of child VMs, thus reducing input/output commands per second (IOPS) at the storage array level. Reducing IOPS reduces storage cost for users.

An example identity set includes, but is not limited to, one or more of the following items: computer name, domain machine account with domain join, license client machine identifier with key management service (KMS) volume license activation, media access control (MAC) address, and/or Internet Protocol (IP) address. For example, a domain identity is selected, at fork time, from a pool of previously-created domain identities. The selected domain identity is applied to the child VM in a way that does not confuse existing processes in the child VM. For example, some examples prevent boot completion of the child VM until customization has finished.

In some examples, the forking and identity configuration operations are implemented as part of a shared computing fabric cloud service that efficiently supports fast, elastic, and automatic provisioning of VMs for multiple cloud services (e.g., tenants of computing fabric cloud service). Some examples of computing fabric cloud service present an application programming interface (API) that may be leveraged by many of cloud services to quickly scale in and scale out of VMs based on demand. In operation, cloud services request resources and properties of the resources, and computing fabric cloud service makes the resources available immediately, instantaneously, or otherwise faster than existing systems.

Aspects of the disclosure include a shared infrastructure (e.g., computing fabric cloud service) accessible via API that enables quick provisioning of VMs by managing a hierarchy of powered-on templates and employing fast VM instantiation operations to quickly spawn VMs with desired properties. Some examples store parent VM templates in a tree hierarchy with each parent VM template representing a linked clone of its parent with its memory shared via copy-on-write (COW). In some of those examples, a set of child VMs, pre-registered to a cloud operating system, is internally maintained for each template. The child VMs are created as a linked clone of the corresponding parent VM template. When one of cloud services commissions or otherwise requests provisioning of one or more VMs, aspects of the disclosure create a COW share of a parent VM template memory to give to requesting cloud service.

In this manner, and as described further herein, computing fabric cloud service supports the instantaneous provisioning of VMs on demand, allows for memory and disk content sharing across cloud services using parent VM templates common to cloud services, and improves cloud service performance by eliminating use of hot spare VMs.

Example Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Example computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an example computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Examples described herein are operable with any cloud service, such as those managing very large datasets (e.g., "big data"), those supporting virtual desktops, and those providing a cloud computing platform as a service or other cloud service provider (e.g., CLOUD FOUNDRY brand computer services). In part by creating and managing parent VM templates as described herein and performing the forking routines, aspects of the disclosure are able to instantly provision (e.g., under a second) these and other cloud services with fully functional VMs with low (e.g., minimal) processor overhead. However, those skilled in the art will note that some examples contemplate sourcing the VM from a VM pool.

Aspects of the disclosure transform a general-purpose computer into a special-purpose computing device when programmed to execute the instructions described herein.

The examples illustrated and described herein as well as examples not specifically described herein but within the scope of aspects of the invention constitute example means for implementing creation of a persistent machine identity for returning users.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A system comprising:
a memory area associated with a computing device, said memory area storing a plurality of static machine identities, each machine identity of the plurality of machine identities associated with one of a plurality of users; and
a processor programmed to:
receive a request from one of the plurality of users for a virtual desktop session;
determine a particular static machine identity previously associated with the user;
create a non-persistent virtual machine (VM), wherein the created VM is distinct from a previous VM assigned to the user, and wherein creating the non-persistent virtual machine includes forking a child VM from a parent VM, wherein forking the child VM from the parent VM includes initially sharing content between the parent VM and the child VM and storing changes to the child VM as copy on write memory pages;
provision the created virtual machine including inserting the determined static machine identity into the created VM such that machine identity elements are inserted into the created VM to implement virtual persistence between the user and the identity of their assigned virtual desktop while the underlying VM is non-persistent, wherein inserting the determined static machine identity includes associating one or more user attributes with the created VM; and
provide the created VM with the inserted machine identity to the user.

2. The system of claim 1, wherein the processor is programmed to create the VM.

3. The system of claim 1, wherein the processor is programmed to access a set of attributes defining a previously-created machine identity.

4. The system of claim 1, wherein the processor is programmed to associate, with the created VM, a set of attributes previously inserted into a VM.

5. The system of claim 1, wherein the processor is programmed to create the machine identity, associate the created machine identity with the user, and store the created machine identity in the memory area.

6. The system of claim 1, wherein the processor is programmed to retrieve the machine identity from the memory area.

7. The system of claim 1, wherein the processor is programmed to provide the machine identity to an operating system.

8. A method for providing virtual desktops, said method comprising:
receiving a request from a user for a virtual desktop session;
determining a particular static machine identity previously associated with the user;
creating a non-persistent virtual machine (VM), wherein the created VM is distinct from a previous VM assigned to the user, and wherein creating the non-persistent virtual machine includes forking a child VM from a parent VM, wherein forking the child VM from the parent VM includes initially sharing content between the parent VM and the child VM and storing changes to the child VM as copy on write memory pages;
provisioning the created VM including inserting the determined static machine identity into the created VM such that machine identity elements are inserted into the created VM to implement virtual persistence between the user and the identity of their assigned virtual desktop while the underlying VM is non-persistent, wherein inserting the determined static machine identity includes associating one or more user attributes with the created VM; and providing the created VM with the inserted machine identity to the user.

9. The method of claim 8, wherein inserting the determined machine identity comprises associating, with the created VM, a set of attributes previously inserted into a VM.

10. The method of claim 8, wherein determining the machine identity comprises accessing a set of attributes defining a previously-created machine identity.

11. The method of claim 8, wherein determining the machine identity comprises creating the machine identity, associating the created machine identity with the user, and storing the created machine identity.

12. The method of claim 8, further comprising associating user installed applications with the machine identity.

13. One or more computer-readable storage media including computer-executable instructions that, when executed, cause one or more processors to:
  receive a request from a user for a virtual desktop session;
  determine a particular static machine identity previously associated with the user;
  create a virtual machine (VM), wherein the created VM is distinct from a previous VM assigned to the user, and wherein creating the non-persistent virtual machine includes forking a child VM from a parent VM, wherein forking the child VM from the parent VM includes initially sharing content between the parent VM and the child VM and storing changes to the child VM as copy on write memory pages;
  provision the created VM including inserting the determined static machine identity into the created VM such that machine identity elements are inserted into the created VM to implement virtual persistence between the user and the identity of their assigned virtual desktop while the underlying VM is non-persistent, wherein inserting the determined static machine identity includes associating one or more user attributes with the created VM; and
  provide the created VM with the inserted machine identity to the user.

14. The one or more computer-readable storage media of claim 13 including computer-executable instructions that, when executed, cause the one or more processors to associate a set of attributes of the user with the created VM.

15. The one or more computer-readable storage media of claim 13 including computer-executable instructions that, when executed, cause the one or more processors to create the machine identify, associate the created machine identity with the user, and store the created machine identity.

16. The one or more computer-readable storage media of claim 13 including computer-executable instructions that, when executed, cause the one or more processors to associate user installed applications with the machine identity.

* * * * *